Feb. 14, 1967 J. S. EATON 3,304,065

PORTABLE HEATED STORAGE AND DISPENSING PLANT MIX ASPHALT UNIT

Filed Nov. 26, 1965 9 Sheets-Sheet 1

INVENTOR
Jay S. Eaton

BY Gustave Miller
ATTORNEY

Feb. 14, 1967 J. S. EATON 3,304,065

PORTABLE HEATED STORAGE AND DISPENSING PLANT MIX ASPHALT UNIT

Filed Nov. 26, 1965 9 Sheets-Sheet 2

INVENTOR

Jay S. Eaton

BY Gustave Miller

ATTORNEY

Feb. 14, 1967 J. S. EATON 3,304,065

PORTABLE HEATED STORAGE AND DISPENSING PLANT MIX ASPHALT UNIT

Filed Nov. 26, 1965 9 Sheets-Sheet 3

INVENTOR
Jay S. Eaton

BY Gustave Miller
ATTORNEY

INVENTOR
Jay S. Eaton
BY Gustave Miller
ATTORNEY

Feb. 14, 1967 J. S. EATON 3,304,065

PORTABLE HEATED STORAGE AND DISPENSING PLANT MIX ASPHALT UNIT

Filed Nov. 26, 1965 9 Sheets-Sheet 5

INVENTOR
Jay S. Eaton
BY Gustave Miller
ATTORNEY

Feb. 14, 1967
J. S. EATON
PORTABLE HEATED STORAGE AND DISPENSING
PLANT MIX ASPHALT UNIT
3,304,065
Filed Nov. 26, 1965
9 Sheets-Sheet 6

INVENTOR
Jay S. Eaton
BY
ATTORNEY

INVENTOR
Jay S. Eaton
BY Gustave Miller
ATTORNEY

INVENTOR
Jay S. Eaton

BY Gustave Miller
ATTORNEY

INVENTOR
Jay S. Eaton
BY Gustave Miller
ATTORNEY

United States Patent Office 3,304,065
Patented Feb. 14, 1967

3,304,065
PORTABLE HEATED STORAGE AND DISPENSING PLANT MIX ASPHALT UNIT

Jay S. Eaton, P.O. Box 6308, West Palm Beach, Fla. 33405

Filed Nov. 26, 1965, Ser. No. 509,964
20 Claims. (Cl. 259—154)

This invention relates to a plant mix asphalt silo unit for storing and dispensing plant mix asphalt, for maintaining it in properly heated condition, and further, to provide a unit, even though bulky, that is readily portable if desired, so that it may be readily transported and set up at a desired location, then when the need therefor is ended at the set up location, may be taken down, and transported to another desired location and be readily set up again with a minimum amount of time and work, utilizing conventional tractors for towing the parts of the unit, and a conventional crane for assembling the parts for use or for disassembling them for transportation.

A further object of this invention is to provide a heated silo wherein heated plant mix asphalt may be deposited and stored therein in a level condition, with substantially no pyramiding, and wherein the asphalt may be dispensed therefrom as required with no "holing out."

A further object of this invention is to provide a unit for storing heated plant mix asphalt in condition for being readily dispensed as needed at a temporary or permanent location, wherein all the elements of the unit may be readily disassembled and transported and then reassembled at a desired location, where it may be maintained as long as needed, then be readily disassembled for removal.

In brief, this unit is for storing and dispensing hot plant mix asphalt after it has been mixed in a central plant. The hot plant mix is to be hauled and dumped into the truck hopper. From the hopper it is discharged evenly through an adjustable gate onto a conveyor belt that will elevate the plant mix to a point above the center of the storage bin or onto a tripper belt if multi-bias are used. (A direct truck dump into the bin is also considered but does not seem to be useful in most installations.)

The mix goes from the end of the conveyor belt into a small hopper that feeds a screw conveyor. The belt conveyor and the screw conveyor are designed to handle up to three hundred tons per hour. The screw conveyor or auger is driven by a gearhead motor and the bottom of the conveyor trough has an adjustable opening so that a uniform amount of material is discharged out the bottom of the trough for its entire length. The gearhead motor also drives a sprocket arrangement through reductions to rotate the entire top of the structure. In doing this, the plant mix falls into the bin in a uniform thickness blanket and does not "cone up" thereby eliminating segregation of the mix. An adjustable cone is located near the discharge doors so that the material falls out of the bin in a uniform manner again to hold segregation of the plant mix to a minimum. The discharge doors are either hand or hydraulically operated.

The unit is either stationary or portable, and is used either with or without a truck scale. The bin unit has "fold down" features for portability, or is made in sections if larger than the eighty ton regular storage is required. Plant mix at up to 350° F. will be stored in the bin or silo and the entire structure is insulated from top to bottom with two to three inches of glass insulation cover. A hot oil heater unit is integrally mounted and continuous one inch pipe heating coils are installed on the lower portion of the bin to compensate for heat losses. An operator's platform to accommodate the person operating the discharge doors and also the scale weigh beam if a scale is used. An axle and a trailer gooseneck or tow hitch tongue are attachable to portable models, and "fold down" features are incorporated in the bin or silo structure.

This process and unit is used to serve areas removed from the central plant, areas where zoning prohibits asphalt plants, by contractors who have to constantly shuttle mix from the central plant to their various jobs, at central plant to their various jobs, at central mix plants where different mixes are being produced to dispense "Local Mixes" to the trade, for areas where there is only seasonal need for plant mix, for municipalities, counties, etc. which are located great distances from source of plant mix asphalt.

With the above and related objects in view, this invention consists in the details of construction and combination of parts, as will be more fully understood from the following description, when read in conjunction with the accompanying drawing, in which.

In the drawings, like numbers refer to like parts, and for purposes of explication, marshalled below are the numbered parts of the improved portable heated plant mix asphalt storing and dispensing silo unit.

Figures 1, 1A, 2, 2A:
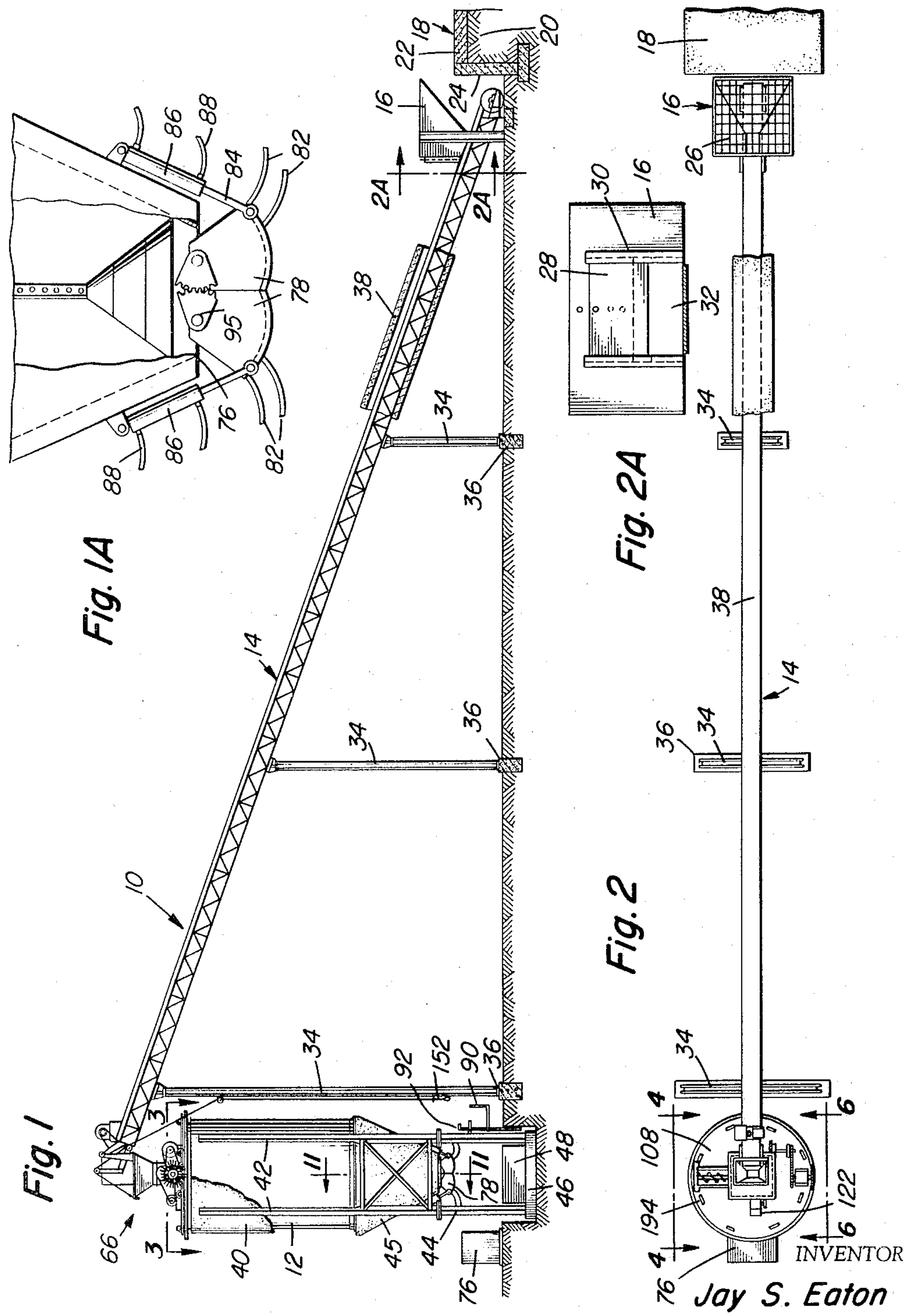
FIG. 1 is a side elevation of the complete invention in operative position.
FIG. 1A is an enlarged fregmentary detail of the silo discharge clamshell gates.
FIG. 2 is a top plan view of FIG. 1.
FIG. 2A is a section on line 2A—2A of FIG. 1.

10—plant mix asphalt dispensing unit
12—silo or bin
14—inclined belt conveyor

16—hopper for 14
18—truck ramp
20—ramp earth
22—ramp pavement
24—ramp retaining wall
26—hopper
28—hopper regulating gate
30—gate tracks
32—hopper discharge opening
34—support stanchions
36—foundations for 34
38—insulated conveyor housing
40—insulation on 38 and 12
42—legs on 12
44—legs on 46
45—conical bottom of 12
46—scale foundation
48—truck scale
50—braces for 42
52—scale trailer
54—silo trailer
56—braces for 44
58—wheels 52 and 54
60—axles for 58
62—tow hitch tongue on 52
64—jacks on 52
66—top of 12
67—removable bar on 52
68—end plug and rim for 12 on 54
70—tow hitch tongue on 68
72—stud bolts for 68 and 110
76—oil heater
78—clamshell gates over 80
80—silo bottom opening
82—flexible oil conduit to 78
84—piston
86—pneumatic cylinder
88—pneumatic conduits
90—operator's platform
92—weigh beam and control board
94—metal baffle cone
95—gear sector on 78
96—vertical square supporting arm
98—holes in 96
100—holding bolt through 98
101—sleeve in 102 for 96
102—supporting skeleton for 101 and 94
104—baffle cone skirts
106—supporting fingers on 104
107—Syntron vibrator
108—silo top
109—electric conduit to 107
110—rim on top 108
112—trolley track hangers
114—electric track
116—trolley
118—electric conduit to 114
120—rigid electric conduit from 116 to 122
122—electric gearhead motor
124—screw conveyor or auger
126—hopper on silo top 108
128—auger housing and trough
130—sector shaped opening in 108 from 128
132—slidable gate for 130
134—threaded control rods for 132
136—pivots on 132 for 134
138—asphalt conveyor belt
140—belt pulley
142—bearing for 140
144—spaced support beams for 142
146—splash shield plates
148—cover for hopper 126
150—hinge for 148
152—control cable for 148
154—yieldable asphalt scraper for 138

156—bias spring for 154
158—manhole and manhole cover in silo top 108
160—shaft of auger 124
162—chain from 122 to 160
164—chain from 160 to 166
166—shaft from 164 to 168
168—chain from 166 to gear 169
169—gear on shaft 170
170—shaft to gear fingers 172
172—gear fingers
174—gear teeth for 172 in flange 176
176—flange on rim 110
178—shaft from 160 to 180 (FIG. 18)
180—reduction gear transmission box
182—shaft from 180 to 184
184—bevel gears
186—shaft from 184 to 188
188—sprocket gear for rotating silo top 108
190—rigid sprocket roller chain on 110
192—circular track on rim flange 176
194—top supporting wheels
195—slots for 194
196—axle for 194
198—ears for 196
200—stud bolts for 198
202—circular angle iron (on bottom of edge of 108)
204—inside depending flange on 202
206—outside depending flange on 176
208—spacing rollers on 204
210—ears for 208

There is shown at 10, in FIG. 1, the entire portable heated plant mix asphalt storing and dispensing silo unit of this invention, set up in operative position in a desired, substantially temporary location. The unit 10 includes a bin or silo 12, which may be twelve feet six inches in outside diameter and approximately thirty feet in height, an inclined, enclosed, belt conveyor 14 approximately one hundred thirty-six feet long, leading up from a hopper 16 adjacent its bottom and adjacent a specially built truck ramp 18 whereby trucks carrying heated plant mix asphalt may readily dump the asphalt into the hopper 16 for delivery into the top of the bin or silo 12.

The truck ramp 18 is specially built for use with the unit, and is abandoned or destroyed when the unit is moved elsewhere. The ramp includes a ramp of earth 20 paved at 22 and leading to a ramp retaining wall 24 adjacent the hopper 16. The hopper 16, shaped as shown, has an open top over which is located a grid 26 with four-inch openings therethrough to limit the maximum size of asphalt lumps that may be fed by the hopper 16 to the belt conveyor 14 through a vertically openable hopper regulating gate 28 guided in vertical tracks 30 and providing a hopper discharge opening 32 of regulated size.

The belt conveyor 14 is supported on three, more or less, vertical stanchions 34 of varying sizes, each set on a suitable temporary but firm foundation 36. The belt conveyor 14 of conventional construction suitable for carrying hot asphalt at a temperature of approximately 350° F. and provided with a gravity belt tightener (not shown) is completely enclosed in a suitable insulated housing 38. The insulation on the housing may be of two inches or more of fiberglass 40 similar to that insulating the silo 12. Conventional power mechanism is provided for operating the belt conveyor 14 at a desired rate of speed.

The silo 12 is supported on four substantial metal legs 42 which in turn are supported on similar metal legs 44 upstanding from a scale foundation 46 on which stands a truck weighing scale 48 of conventional construction. The legs 42 are conventionally and temporarily firmly secured on the legs 44, and two sets of cross braces 50 are provided between and adjacent the bottom ends of each pair of legs 42, where the legs 42 extend along but spaced from the conical discharge cone bottom.

As shown in FIGS. 14 to 18 inclusive, the scale 46 and foundation 48 and the silo 12 are portable by being temporarily converted into trailer vehicles 52 and 54. The legs 44 on the scale foundation 46 are provided with braces with two sets of braces 56, the other sides being left open for the entry of trucks under the silo when set up. A crane is used to both set up or disassemble the silo and scale. The scale trailer 52 is formed by suitably adding a pair of wheels 58 and axle 60 to one end of the foundation 46, and a gooseneck or tow hitch tongue 62 to the other end in any conventional manner, such as bolt and nuts, and a power tractor may then haul it wherever desired. Similar, and preferably interchangeable wheels 58 and axle 60 are similarly secured to the lower ends of legs 42 and jacks 64 are temporarily secured to the other end of legs 42. Then, while supported on the jacks 64, the silo top feeding mechanism shown generally at 66 is removed and nested on the scale trailer 52 after temporarily removing the top cross bar 67 for travel, and an end plug 68 with a rim having a tow hitch tongue 70 on the plug is secured, such as by stud bolts 72 in the place of the silo top mechanism 66. The conveyor 14, foundation 34 and hopper 16 are placed on the scale trailer 52 or on a conventional truck for travel, the conveyor being first disassembled in a conventional manner. Thus, the entire unit may be transported as desired.

The silo 12, insulated at 40 by at least two or three inches of fiberglass held in place by netting or other conventional means, has its conical discharge bottom end 45 surrounded by a coil of heating pipes 64 through which hot oil, at a temperature of approximately 350° F. will circulate from an oil heating stove 76 located to one side, through suitable connecting conduits (not shown). Similar heating pipes are located in the face of the two clamshell discharge gates 78 for controlling the discharge through the bottom opening 80, the hot oil reaching the clamshell gates 78 through flexible conduits 82. These gates 78 may be opened or closed by pistons 84 from pneumatic cylinders 86 and pneumatic conduits 88 controlled by the scale operator on a platform 90 provided with a weigh beam and control board 92. Gear sectors 95 on the clamshell gates 78 may be used to insure coordination of the gates 78.

To cause the hot asphalt in the silo 12 to be discharged evenly without "holing out," a metal baffle cone 94 is adjustably located within the conical bottom end 45 of the silo 12. This baffle is secured on a square vertical supporting arm 96 having a plurality of vertically spaced holes 98 for receiving a holding bolt 100 therethrough and through a sleeve 101 on a supporting skeleton 102. In addition the cone 94 has one or more frusto-conical ring skirts 104 secured thereto by depending fingers 106. Thus, both the size and the location of the cone 94 may be adjusted, while the silo is empty, according to the type of asphalt mix to be used therein, such adjustment having of course been previously determined. An electric vibrator 107 powered by conduit 109 is secured on the inside of the bottom of the baffle cone 94 and is used as needed, usually when commencing a delivery to a truck, for vibrating the asphalt as needed to make it flow down readily. A conventional vibrator, such as model V–35, shown on page A/10 of Bulletin V–62,865 Pulsating Magnet Electric Vibrators © Syntron Company, 1964, may be used.

The silo feeding mechanism shown generally at 66 includes a silo top 108 rotatably mounted thereon as follows. In order that the silo top 108 may be as readily removable and replaceable as the plug 68, it is also provided with a rim 110 held in place on the silo 12 by stud bolts 72 inserted from the outside. As apparent in FIGS. 9 and 10, the rim 110 extends sufficiently above the top edge of silo 12 to provide space for hangers 112 on which is supported an endless circular three pole electric trolley track 114, of conventional construction, for use with a conventional electric trolley 116 the track 114 being connected by a suitable conduit 118 to a suitable source of electricity. Bulletin 100, of the Feedrail® Corporation, © 1962, on page 8 shows a suitable seven foot radius three pole track suitable for this purpose, and on page 19, Cat. No. FR–6D–LRF634 shows a suitable three pole trolley for this purpose. A suitably bent rigid conduit 120 from trolley 116 is connected to an electric gearhead motor 122 which is mounted on the silo top 108 and serves both for rotating the top and for operating an auguer or screw conveyor 124.

This auger 124 is located on top 108 at the bottom of a central hopper 126 connected to an auger housing 128 over an adjustable sector shaped opening 130 controlled by slidable gate 132 adjustable by threaded control rods 134. It will be apparent that as a result of the pivot connections 136, the gate is also angled when adjusting the size of the opening 130, so as to make it larger at the outside of the radius and thus feed a greater amount of asphalt at the greater radius, and thus be adjusted to make a level fill of the silo 12.

Figures 4, 5:
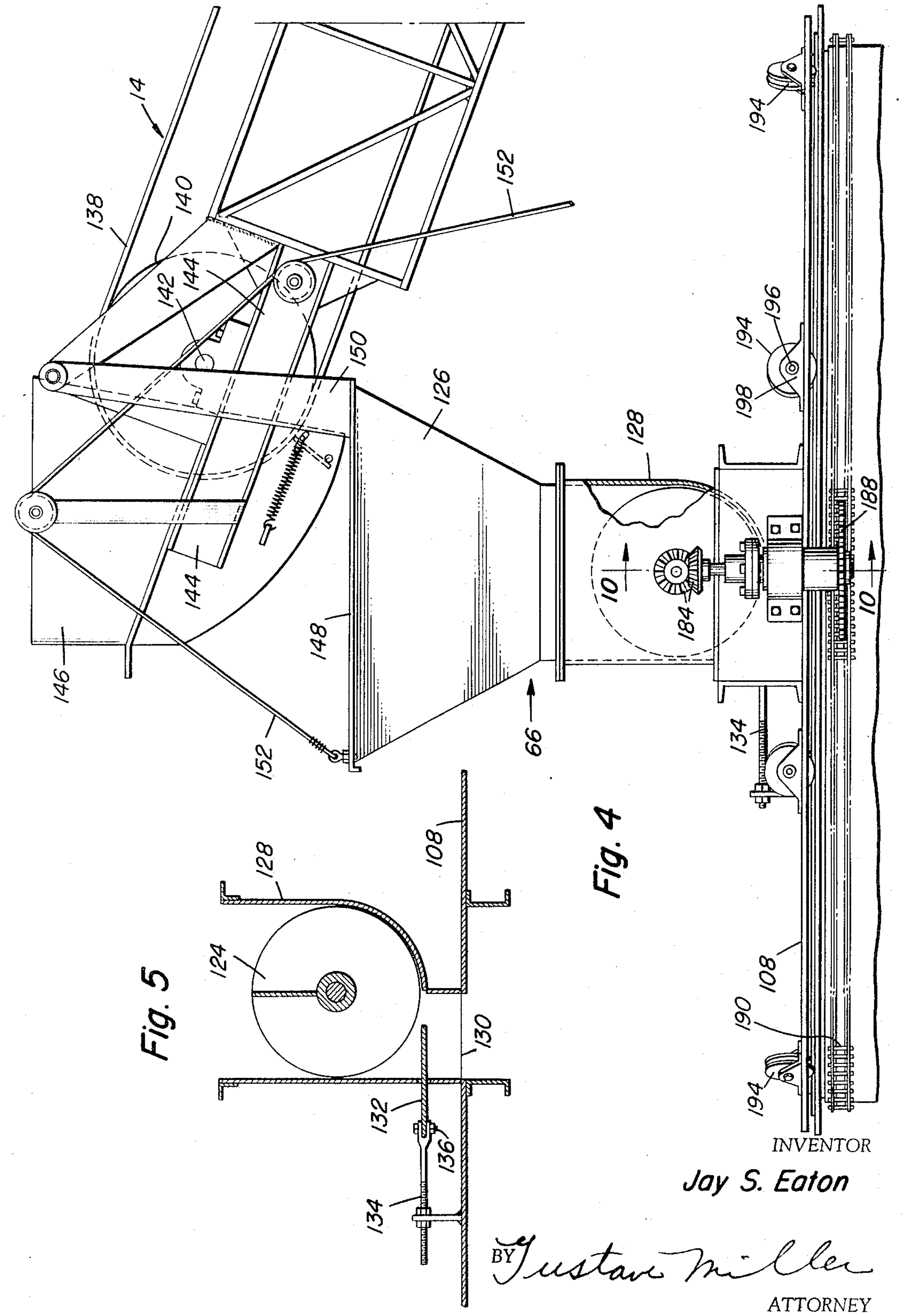
FIG. 4 is a side elevation of the revolving top cover plate of FIG. 3, but including the hopper and discharge end of the conveyor, on an enlarged scale, on line 4—4 of FIG. 2, but showing a gear reduction transmission as in FIG. 18.
FIG. 5 is a section showing the adjustable gate in the hopper, on an enlarged scale, on line 5—5 of FIG. 3 and FIG. 18.

The hopper 126 is preferably circular and frusto-conical in shape, located at the center of silo top 108, and under the discharge end of asphalt conveyor belt 138 of the belt conveyor 14, as shown in FIG. 4, a pulley 140 for the belt 138 has bearings 142 supported on spaced apart beams 144 secured on the belt conveyor 14. Side splash shield plates 146 help guide the asphalt from the belt 138 into the hopper 126 when the hopper cover 148, mounted on hinges 150 pivoted on beams 144, so that, when lifted by manually controllable cable 152 whose control end is located at the operator's platform 90, the hopper cover 148 is clear of the hopper 126 and of the discharge end of belt 138. In addition, it may act as a deflector, when open, to prevent asphalt from overshooting the hopper. It is also clear of a scraper 154 biased by spring 156 against the belt 138 to scrape the asphalt from the belt 138 into hopper 126.

The top 108 is provided with a manhole and manhole cover 158 through which a flexible ladder may be inserted (when empty and cold), for making inside adjustments, such as to the baffle cone 94 or elsewhere.

Figure 3:
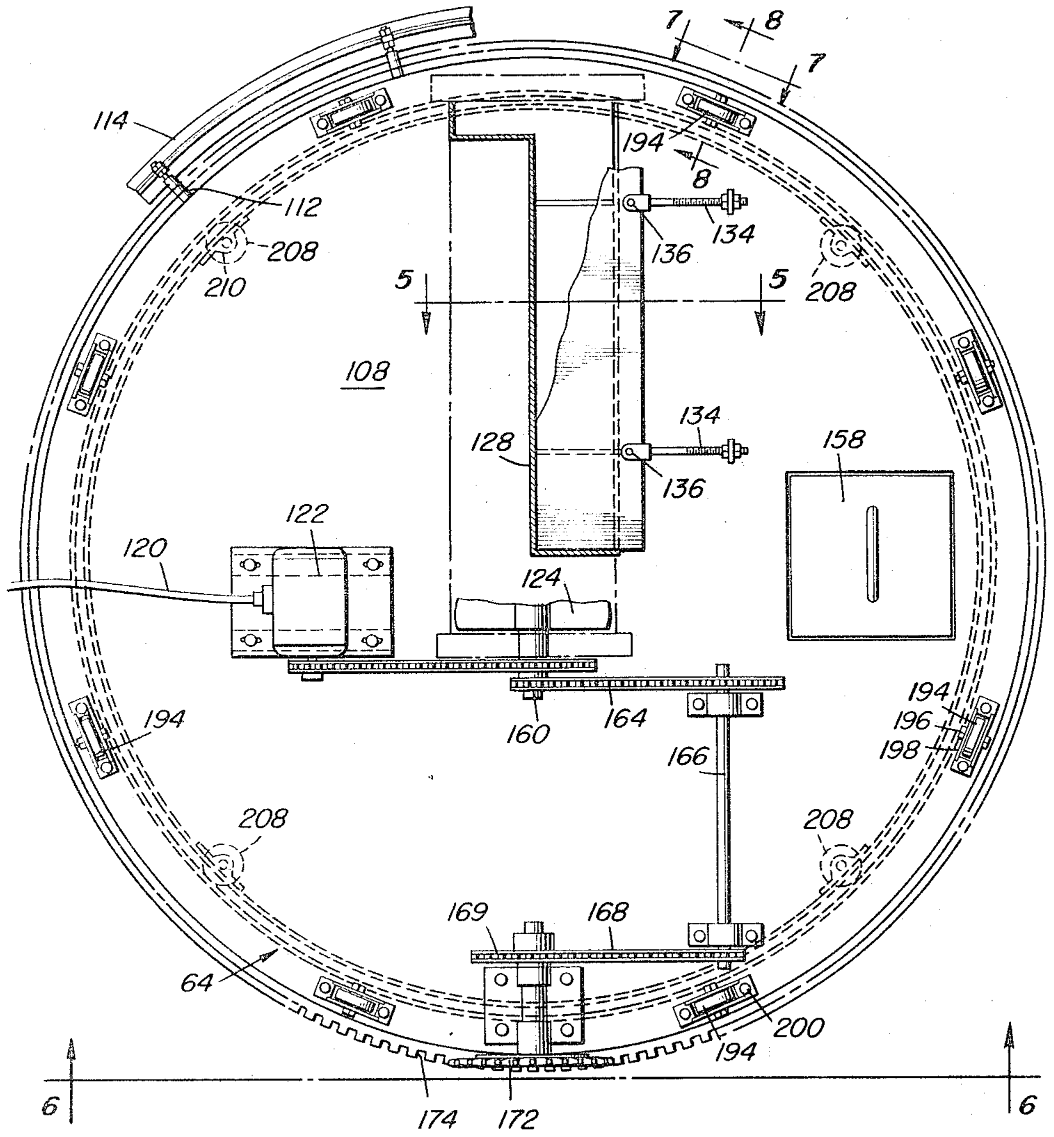
FIG. 3 is a top plan view of the cover plate and its rotating mechanism, on an enlarged scale, on line 3—3 of FIG. 1, showing a chain transmission.
Figures 6, 7, 8:
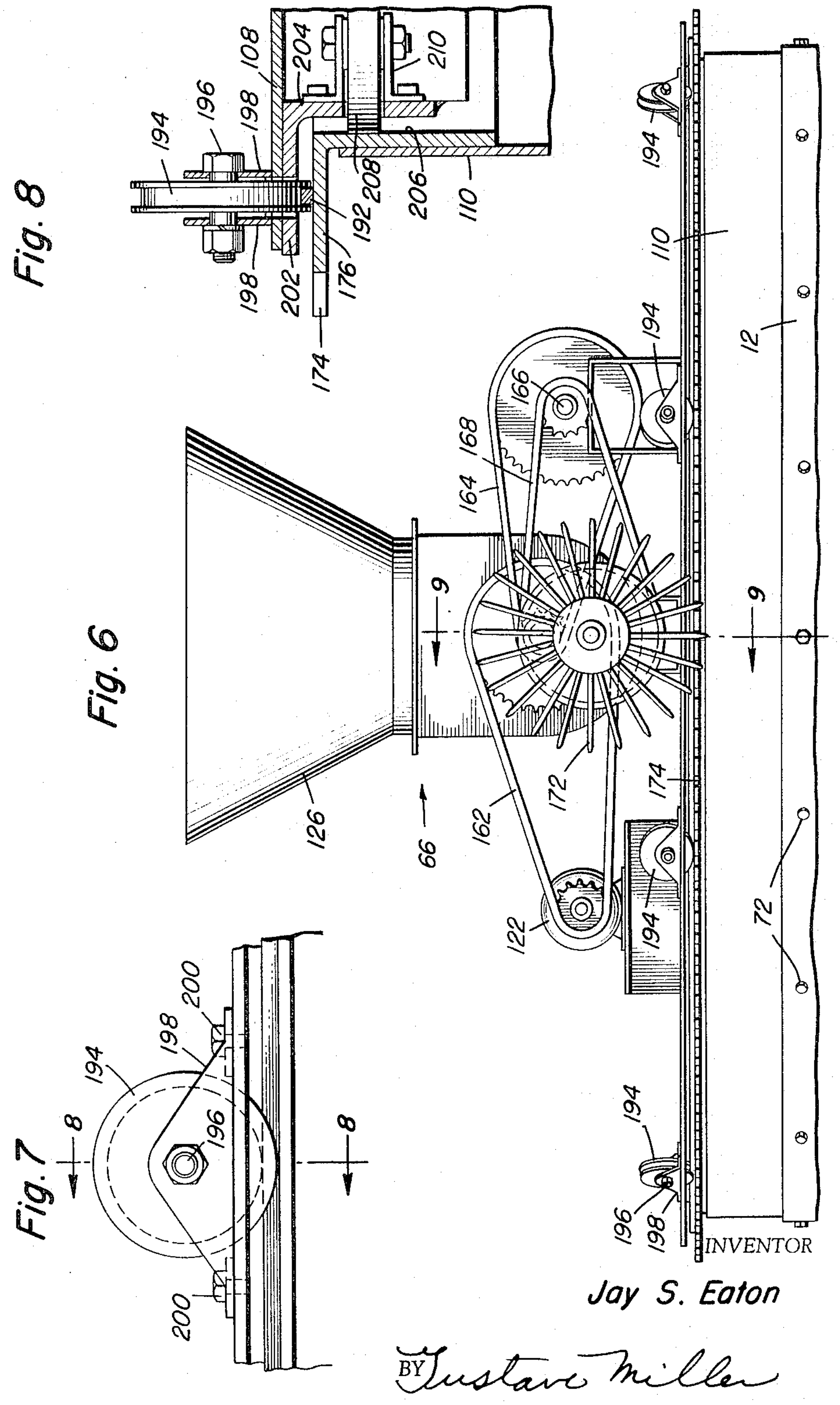
FIG. 6 is an enlarged side elevation of the driving mechanism of the cover plate, on line 6—6 of FIG. 2 and FIG. 3.
FIG. 7 is a side elevation, on a large scale, of one of the cover plate castors, on line 7—7 of FIG. 3 and FIG. 18.
FIG. 8 is a vertical section on line 8—8 of FIG. 3 and FIG. 7.

The gearhead motor 122 powers the shaft 160 of auger 124 by a chain 162. In FIGS. 3 and 6, the top 108 is rotated from the motor 122 through a power transmission train consisting of chain 162, shaft 160, chain 164, shaft 166, chain 168, gear 169, shaft 170, and gear fingers 172 cooperating with gear teeth 174 provided in a flange 176 mounted and secured on rim 110.

Figure 9:
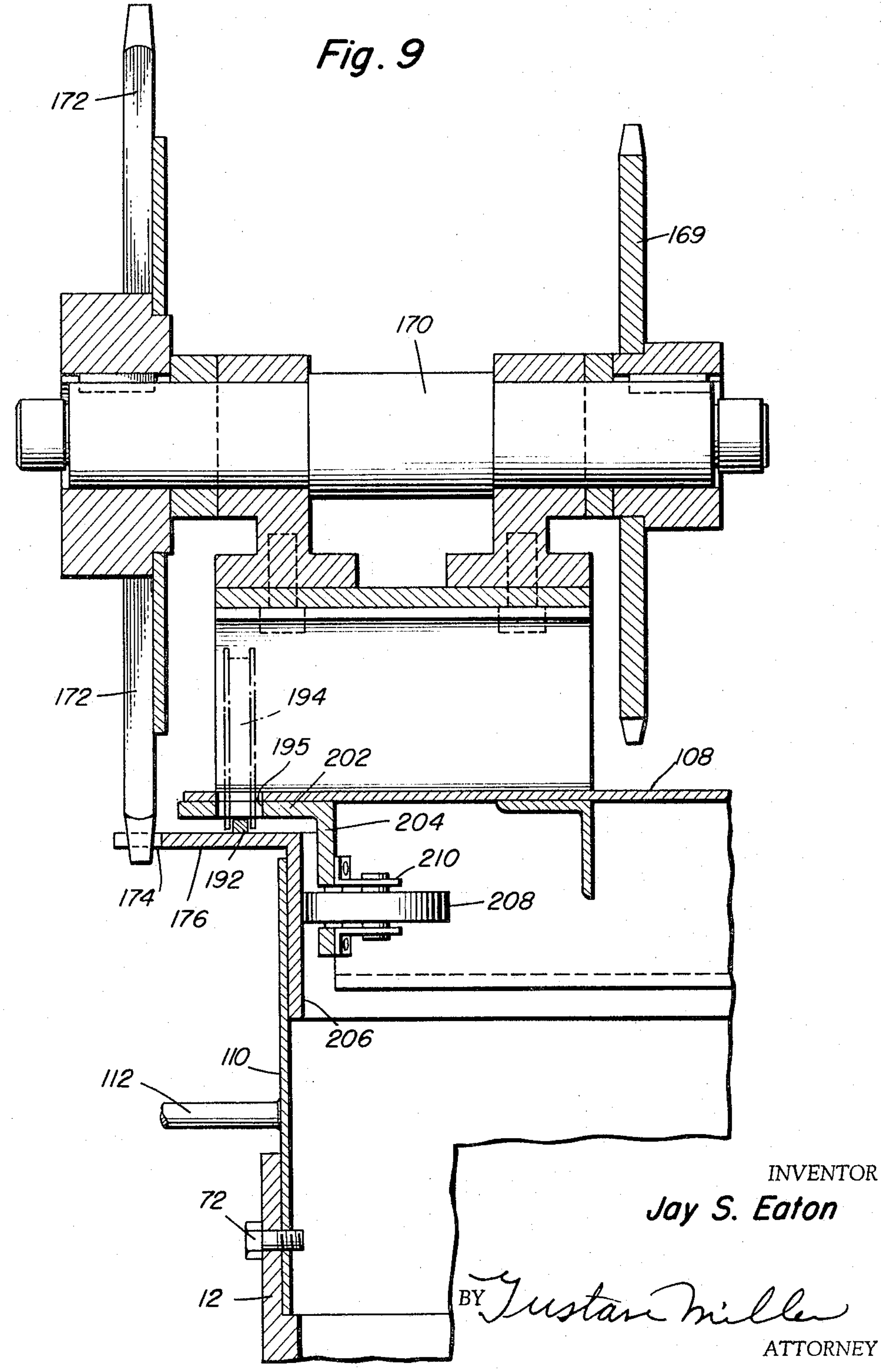
FIG. 9 is an enlarged sectional detail on line 9—9 of FIG. 6.
Figure 10:
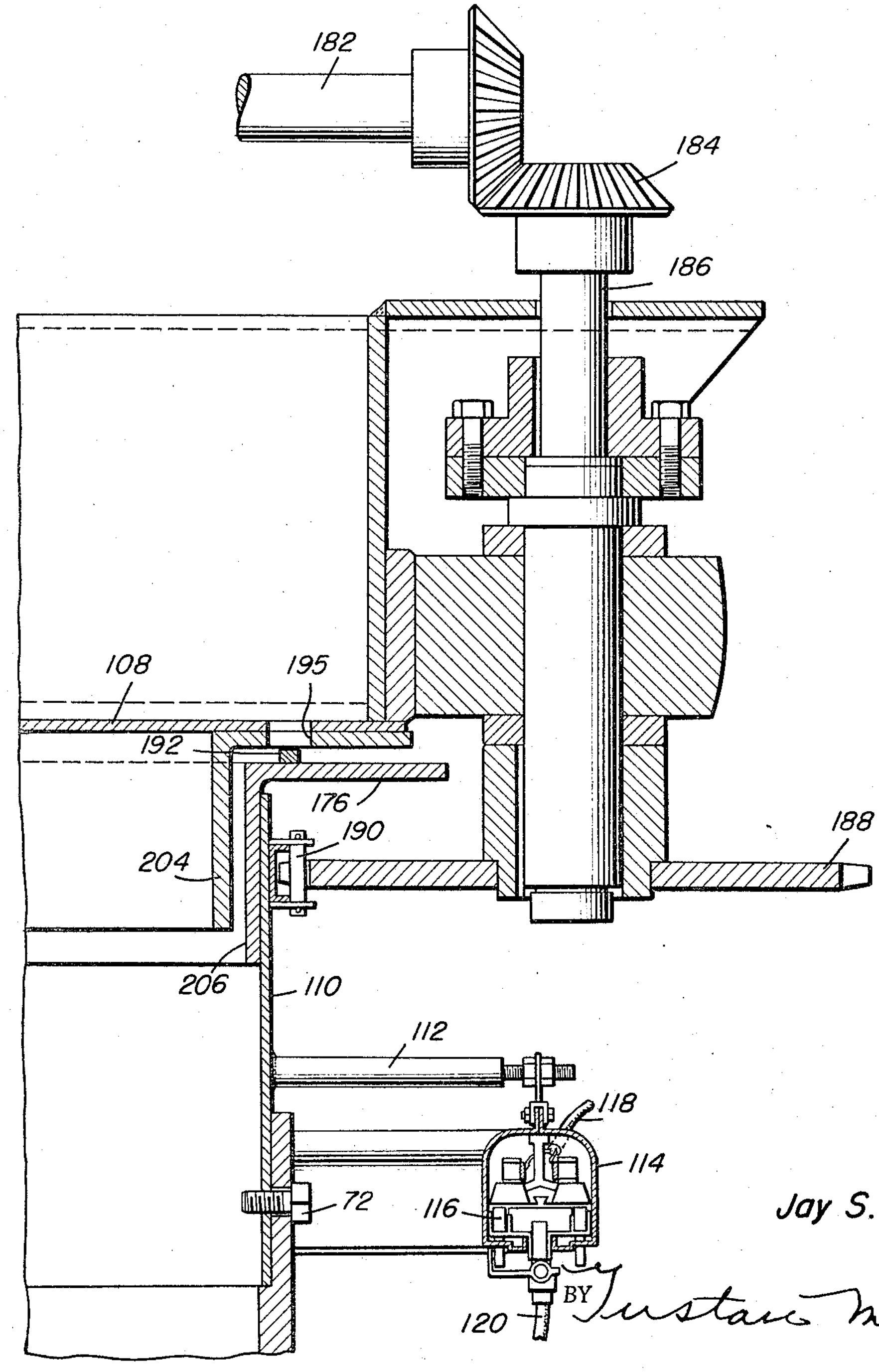
FIG. 10 is an enlarged sectional detail on line 10—10 of FIG. 4 and FIG. 18.
Figures 11, 12, 13:
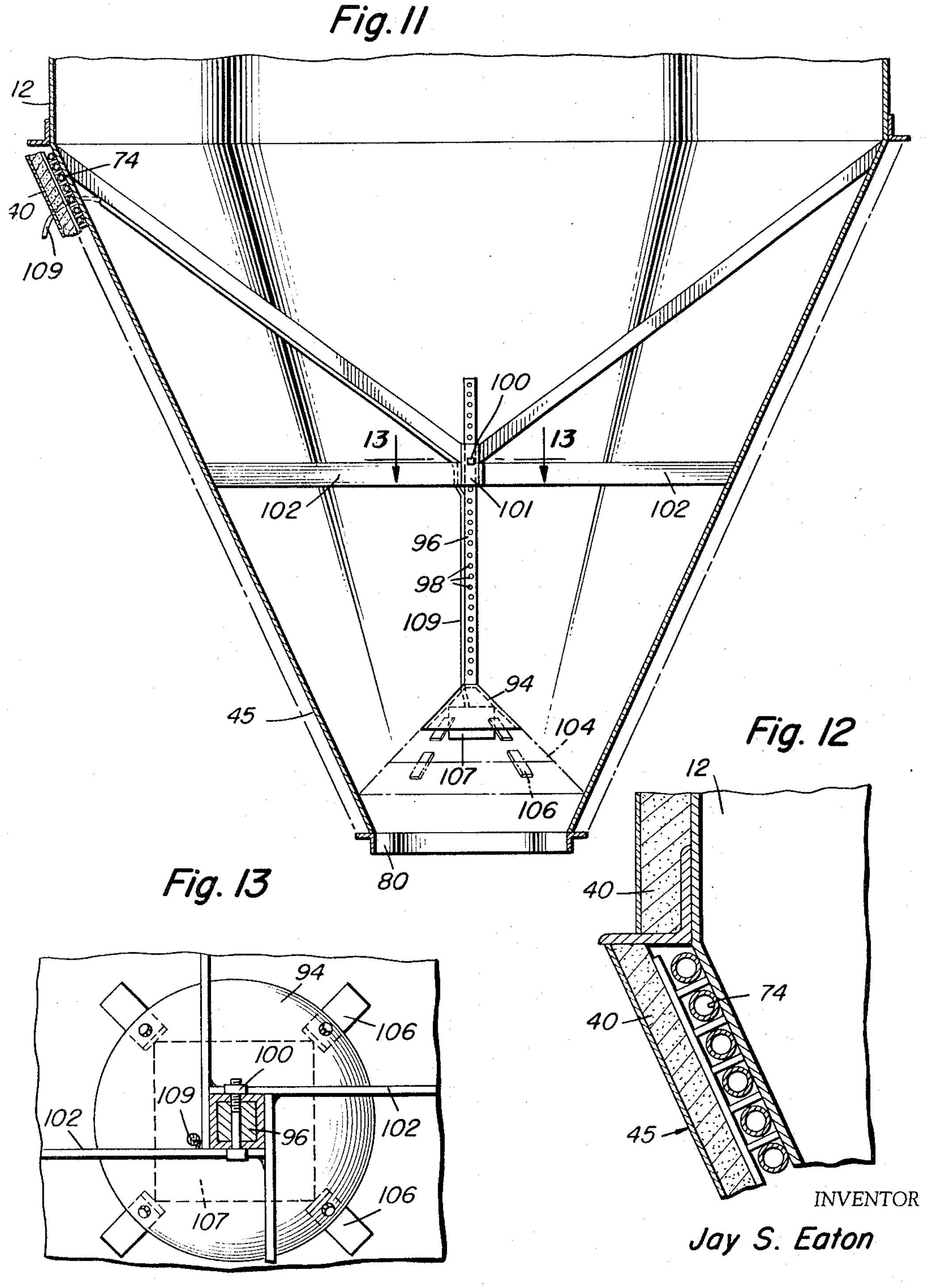
FIG. 11 is a section, on a large scale, of the heated discharge spout, on line 11—11 of FIG. 1.
FIG. 12 is an enlarged detail of the heating coil.
FIG. 13 is a larger scale showing of the adjustable baffle cone gate on line 13—13 of FIG. 11.
Figure 15:
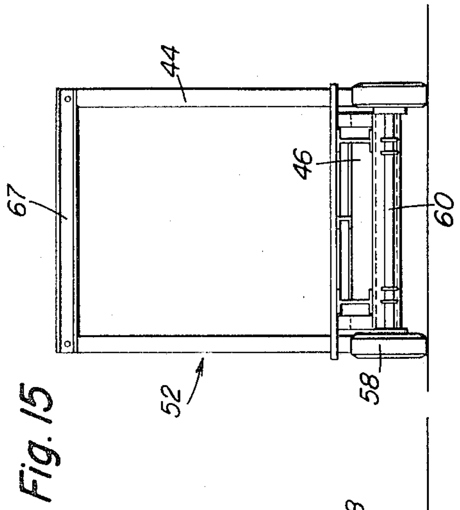
FIG. 15 is a view looking at the right end of FIG. 14.
Figure 17:
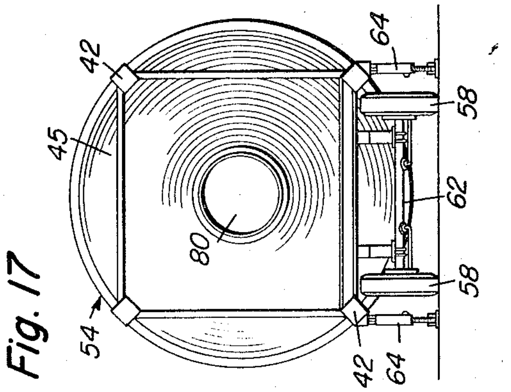
FIG. 17 is an end view looking at the right end of FIG. 16.
Figure 14:
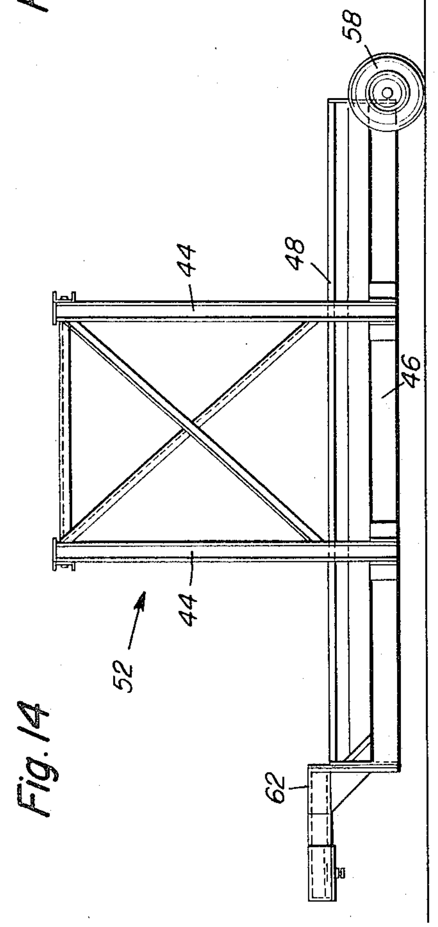
FIG. 14 is an elevation of the scale and scale foundation base, with trailer wheels and tow hitch attached.
Figure 16:
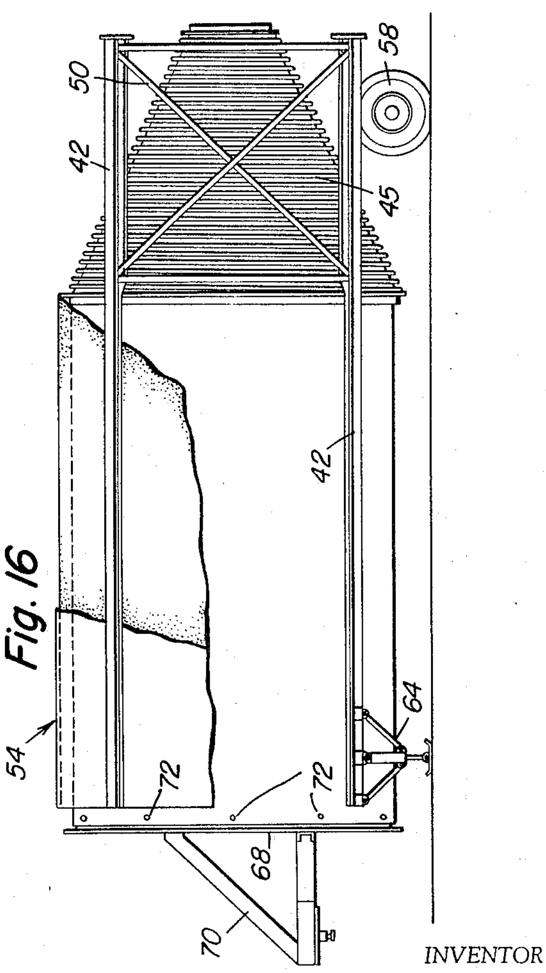
FIG. 16 is an elevation of the silo or bin with trailer wheels attached for use in transporting the silo to and from the temporary location.
Figure 18:
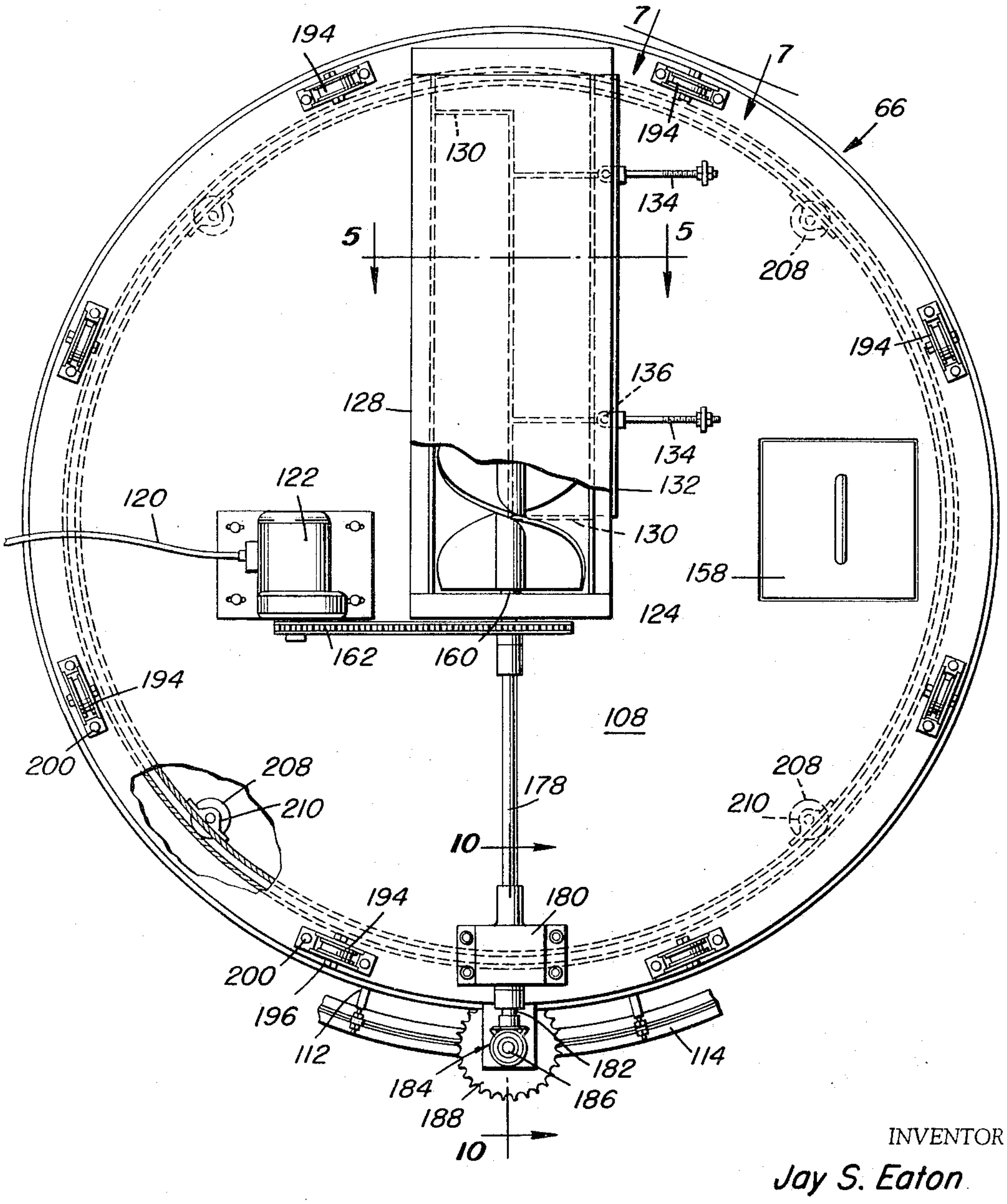
FIG. 18 is a view similar to FIG. 3, but showing a reduction gear box transmission.

In FIGS. 4, 10 and 18, the motor 122 powers chain 162 on auger shaft 160, and also the shaft 178 extending from auger shaft 160 to a reduction gear transmission box 180, containing a suitable reduction gearing to bevel gear shaft 182 to meshed bevel gears 184 and shaft 186 to silo rotating sprocket gear 188 meshing with the rigid sprocket roller chain 190 fixedly secured to the rim 110 about the circumference of the silo 12 adjacent its top edge located above the hangers 112 for the trolley electric track 114, as seen in FIG. 9.

A circular track 192, rectangular in cross section, located on the flange 176 cooperates with the double flanged supporting wheels 194, here shown as eight in number, equally spaced circumferentially about the top 108, and journaled on axles 196, each in a pair of upstanding ears 198 secured by stud bolts 200. The wheels 194 extend through suitable slots 195 in silo top 108 and aligned slots in silo top supporting circular angle iron 202 having a depending flange 204 spaced within the depending flange 206 securing flange 176 to rim 110. A plurality of spacing rollers 208, here shown four in number, journaled on ears 210 on inner flange 204 bear against outer flange 206 to keep the rotating top 108 in proper spaced relation to the side of the silo 12.

In operation, the scale trailer 52 and silo trailer 54 are towed to the desired temporary location, along with the hopper 16 and disassembled belt conveyor 14 and its stanchions 34. The stanchion foundations 36 and ramp 20 having been properly prepared, along with an excavation and truck approach thereto, the parts of the unit 10 are set up and assembled with the aid of a suitable crane, in a manner obvious from the foregoing description, the scale 46 and scale 48 being first set up, then the silo 12 is assembled thereon. The towing plug 68 and tow hitch 70 is then removed by the crane, and the silo top 108 and its assembled parts thereon are put into position, along with the oil heater 76, and the electric conduits are connected to a suitable source of electricity. Trucks from an asphalt mixing plant bring the asphalt mix up the ramp 18 and dump it into the hopper 16 through size limiting grid 26, and the operator on stand 90 through the controls on his control board 92 sets the conveyor belt into operation, after pulling cable 152 to open hopper cover 148, and ties the cable 152 to hold cover 148 open. Motor 122 is operated, and silo top 108 rotates and auger 124 likewise rotates, the adjusting bolts 134 having been set to open the auger gate 132 to the desired angle opening to feed a level amount circumferentially into the silo 12. The plant mix is delivered in heated condition, and the oil heater 76 is operated to maintain a desired temperature of between 350° and 400° F. continuously in the silo 12. As the asphalt is needed locally, the operator opens the clamshell gates 78 to discharge the asphalt to a truck on the scale 48, the vibrator 107 being operated on baffle cone 94 to start the flow of asphalt, the vibrator 107 being continued in operation as needed. When the truck is loaded, the operator closes the clamshell gates 78 until the next truck is in position. The silo 12 thus maintains an ample reserve of asphalt as needed locally, and the silo is replenished from the mixing plant as needed.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A heated plant mix asphalt storing and dispensing silo unit comprising a silo substantially circular in horizontal cross-section, means for mounting said silo in upstanding position, means for uniformly feeding asphalt into said silo through its top end through a radial opening therein, a conical base section on the bottom of said silo, a circular discharge opening in the bottom of said conical base section, controllable gate means for said discharge opening, means for heating said conical base section, and circular asphalt flow control baffle means in said base section above said circular discharge opening.

2. The unit of claim 1, said silo asphalt feeding means including a rotatable top on said silo, means providing a radially extending adjustable gate over said radial opening in said silo top, an asphalt hopper supported centrally over said top, and a radially extending auger on said top extending from under said hopper over said radial gate opening.

3. The unit of claim 2, and motor means for rotating said silo top and for rotating said auger.

4. The unit of claim 2, and a conveyor feeding asphalt into said hopper from one end of said conveyor.

5. The unit of claim 4, and a cover for said hopper, and link means hinging said cover for movement away from under the discharge end of said conveyor.

6. The unit of claim 4, means for supporting said conveyor at an incline, a hopper for feeding asphalt on said conveyor, and an asphalt lump size limiting grid on the entrance top of said conveyor feeding hopper.

7. The unit of claim 4, and insulating means enclosing the side of said silo unit.

8. The unit of claim 1, and means for agitating stored asphalt comprising a vibrator secured to the bottom of said baffle means.

9. The unit of claim 1, and means for also heating said discharge opening gate means.

10. The unit of claim 1, in combination with means for supporting said silo for transportation comprising wheel and axle means removably secured to the base end of said upstanding position mounting means, jack means removably secured to the top end of said same upstanding mounting means, and a tow hitch tongue and brace removably secured to the top end of said silo.

11. The unit of claim 1, in combination with a mobile truck weighing scale unit beneath said base end of said silo, said scale unit including upright means for supporting said silo upstanding mounting means, wheel and axle means removably secured to one end of said scale unit, and a tow hitch tongue and brace removably secured to the other end of said scale unit.

12. The unit of claim 1, said silo unit including a readily removable top unit, said top unit including a rim detachably secured to the top end of said silo, a silo top, means rotatably supporting said silo top on said rim, motor means on said silo top, and a power transmission train connecting said motor means to said rim.

13. The unit of claim 12, said power train including gear fingers actuated by said power train and cooperating gear teeth on said rim.

14. The unit of claim 12, said power train including a sprocket wheel actuated by said power train and cooperating chain means rigidly secured on said rim.

15. The unit of claim 12, a central hopper on said rotatable top, an auger and auger housing on said top extending radially from under said hopper, said top having a radially extending sector shaped opening therein under said auger, said power train actuating said auger to feed asphalt fed thereto by said hopper to drop through said radially extending opening into said silo.

16. The unit of claim 15, said auger housing including a gate for adjusting the size of said sector shaped opening.

17. The unit of claim 12, said motor means being electrically powered, an electricity power track on said rim, an electric trolley movable on said power track, and power conduit means connecting said trolley to said motor means.

18. The unit of claim 1, and means for adjustably mounting said baffle means relative to said discharge opening.

19. The unit of claim 1, said baffle means being a cone, and frusto-conical adjusting skirt means securable thereto.

20. The unit of claim 1, said silo asphalt feeding means including a circular rotatable top on said circular silo, an asphalt hopper supported over said top, and motor means for rotating said circular silo top.

References Cited by the Examiner

UNITED STATES PATENTS

| | | | |
|---|---|---|---|
| 1,884,423 | 10/1932 | Walker | 259—150 |
| 2,746,733 | 5/1956 | Edgerton | 259—147 |
| 3,054,601 | 9/1962 | Wright | 259—159 |
| 3,145,855 | 8/1964 | Plugge et al. | 215—17 |
| 3,182,859 | 5/1965 | Harris et al. | 222—132 |

References Cited by the Applicant

UNITED STATES PATENTS

| | | |
|---|---|---|
| 1,136,204 | 4/1915 | Bledsoe. |
| 1,867,739 | 7/1932 | Frazee. |
| 2,413,908 | 1/1947 | Chester. |
| 2,705,133 | 3/1955 | Barber et al. |
| 2,918,185 | 12/1959 | Farnham et al. |

WALTER A. SCHEEL, *Primary Examiner.*

ROBERT W. JENKINS, *Examiner.*